United States Patent [19]

Senuma et al.

[11] Patent Number: 5,291,298
[45] Date of Patent: Mar. 1, 1994

[54] VIDEO SIGNAL PROCESSING APPARATUS FOR CONTROLLING EXPOSURE, FOCUS, AND WHITE BALANCE FOR A VTR INCORPORATED IN A VIDEO CAMERA

[75] Inventors: Toshitaka Senuma; Kenta Tanaka, both of Tokyo; Takashi Kohashi, Kanagawa, all of Japan

[73] Assignee: Sony Corporation, Tokyo, Japan

[21] Appl. No.: 6,774

[22] Filed: Jan. 21, 1993

[30] Foreign Application Priority Data

Jan. 31, 1992 [JP] Japan .................... 4-042397

[51] Int. Cl.$^5$ .................... H04N 9/79; H04N 9/89
[52] U.S. Cl. .................... 358/310; 358/326; 358/906
[58] Field of Search .................... 358/29, 906, 35, 40, 358/166, 37, 335, 337, 310, 29 C, 160, 21 R, 326; H04N 9/79, 9/89

[56] References Cited

U.S. PATENT DOCUMENTS

| | | | |
|---|---|---|---|
| 4,405,937 | 9/1983 | Kudo et al. | 358/40 |
| 4,613,909 | 9/1986 | Tobe | 358/310 |
| 4,985,781 | 1/1991 | Hirasawa | 358/310 X |
| 5,093,716 | 3/1992 | Kondo et al. | 358/29 C X |
| 5,142,375 | 8/1992 | Fukuda et al. | 358/310 |

Primary Examiner—Mark R. Powell
Assistant Examiner—John W. Miller
Attorney, Agent, or Firm—William S. Frommer; Alvin Sinderbrand

[57] ABSTRACT

A video signal processing apparatus for a video camera having a video tape recording and reproducing device integrated therewith. The apparatus includes an automatic phase control (APC) circuit for controlling the phase of a color signal component contained in a video signal, a generating circuit having a microcomputer for generating a control signal for controlling the iris, focus and white balance of a video signal supplied from the video camera, and a digital operation circuit which is commonly used by the APC and generating circuits. The digital operation circuit includes an input device for receiving an output signal from the APC circuit and the video signal from the video camera, a processing device for processing the output signal and the video signal received by the input device, a device for supplying respective processed signals from the processing device to the APC and generating circuits, and a control device for controlling the input device, the processing device and the supplying device.

5 Claims, 3 Drawing Sheets

VIDEO SIGNAL PROCESSING APPARATUS FOR CONTROLLING EXPOSURE, FOCUS, AND WHITE BALANCE FOR A VTR INCORPORATED IN A VIDEO CAMERA

BACKGROUND OF THE INVENTION

1. Field of the Invention

This invention relates to a video signal processing apparatus well adapted when it is used, for example, in a video camera.

2. Description of the Prior Art

When using a video camera, it is necessary to control exposure, focus, white balance, etc. To perform this control automatically, data including Y, R, G, and B, which are obtained by taking a photograph of an object, are integrated individually, and then the data are stored in RAM as area data in correspondence with split screens. The data are transferred to a microcomputer for the video camera in order to generate signals to control the iris, focus and white balance.

When a VTR is incorporated in a video camera, it is necessary to provide a circuit to process video signals reproduced from a magnetic tape. Such a circuit must include an automatic phase control circuit (APC circuit) to control the phase of a color signal component.

Conventionally, an OPD (optical detector) circuit to process signals for control of iris, focus and white balance, is designed to be placed independently of a APC circuit to control the phase of a color signal component. As a result, the configuration is complicated, with a great number of parts, enlargement in size, and increase in cost.

OBJECTS AND SUMMARY OF THE INVENTION

In consideration of these conditions, this invention is intended to permit simplification of the construction and reduction of the cost.

The video signal processing apparatus according to this invention is characterized by the configuration having an APC circuit as phase controlling means to control the phase of a color signal component contained in a video signal, a microcomputer as generating means to generate a signal for control of iris, focus and white balance after detection of the video signal output by the video camera, and a digital operation circuit as operating means which is commonly used for the APC circuit and for the microcomputer to operate the signal processed by the APC circuit and the microcomputer.

In the video signal processing apparatus of which configuration is mentioned above, the digital operation circuit which operates a signal processed by the APC circuit and microcomputer is commonly used in APC operation and OPD operation. It is therefore possible to reduce the number of parts, to simplify the configuration, and to reduce the cost.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
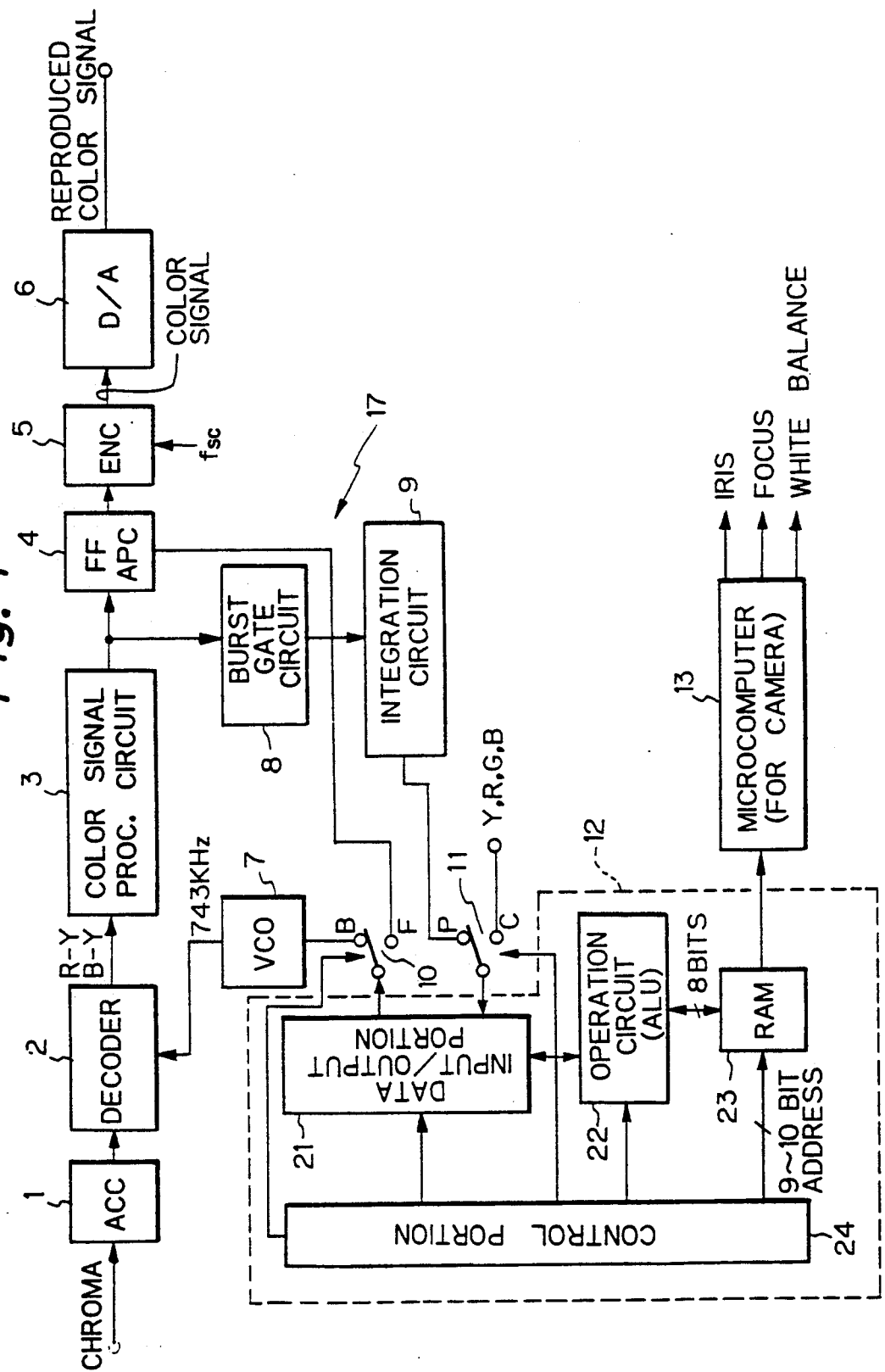
FIG. 1 is a block diagram illustrating an embodiment Of a video camera to which a video signal processing apparatus according to this invention is applied.

FIG. 1 is a block diagram showing the configuration of an embodiment of a video camera (VTR-built-in type), to which the video signal processing apparatus according to this invention is applied. An ACC circuit 1 controls input of digital video data so that its color burst component will be at a constant level, and then outputs the color burst component to a decoder 2. The decoder 2 converts into a baseband, the R-Y and B-Y chroma data, which have been already converted into a signal modulating by a low frequency carrier of 743 kHz, and are entered from the ACC circuit 1, and outputs the chroma data to a color signal processing circuit 3. The color signal processing circuit 3 submits the input data to deemphasis processing and to comb-filter processing which is intended to remove cross talk. The data is supplied to a feed forward (FF) APC circuit 4 and to a burst gate circuit 8.

The burst gate circuit 8 makes only a burst component pass in the video data entered. The output of the burst gate circuit 8 is integrated by an integration circuit 9, and sent to a data input/output portion 21 of a digital operation circuit 12 through the contact P of a switch 11. The data output from the data input/output portion 21 are fed to a VCO 7 through the contact B of a switch 10 so as to control the oscillation frequency of the VCO 7. The reference signal of 743 kHz output from the VCO 7 is supplied to the decoder 2. The circuits mentioned above compose an automatic phase control circuit 17.

The signal output from the feed-forward APC circuit 4 is fed to an encoder 5 so that it will be multiplied by the reference color subcarrier of the frequency fsc (=3.58 MHz). The encoder 5 converts into chroma data of 3.58 MHz, the color-difference data sent from the feed forward APC circuit 4 and outputs the converted color-difference data to a D/A converter 6. The D/A converter 6 converts the input of the chroma data into an analog chroma signal, so that the chroma data will be output.

In addition to the data input/output portion 21, the digital operation circuit 12 has the operation portion 22, which is composed of ALO, RAM 23 which stores data at random, and a control portion 24, which controls the data input/output portion 21, operation portion 22 and RAM 23 by microprogramming process. These devices are formed in one digital signal processing IC. A microcomputer 13 processes data sent from the RAM 23, and generates an iris control signal, focus control signal, white balance control signal, etc.

Then, the operation will be mentioned below. Description will be made on the operation when a video signal is reproduced from a video tape, which is not shown in the figure. Then the video signal reproduced from the video tape is converted into digital data, and is supplied to the ACC circuit 1. The ACC circuit 1 outputs the burst color component to the decoder 2 after keeping its level at a constant value. The decoder 2 multiplies the low-pass chroma signal of 743 kHz by the reference data of 743 kHz, which is sent from the VCO 7, so as to generate the color-difference data R-Y and B-Y of the baseband and to output the color-difference data to the color-signal processing circuit 3. The color signal processing circuit 3 submits the color-difference data to deemphasis and comb-filter processing, and feeds the processed data to a burst gate circuit 8.

The burst gate circuit 8 extracts only the burst signal component from the signals entered. The burst signal component is integrated by the integration circuit 9, and is fed to the data input/output portion 21 through the contact P of a switch 11 (which is switched to the contact on the P side when the playback mode is selected). The control portion 24 supplies the data which are entered to the data input/output portion 21, to the operation portion 22, so that the operation portion 22 will perform the operation necessary for playback (PB) APC filter (low-pass filter) processing by feedback loop, and the operation necessary for feed-forward APC filter processing. When this complicated operation is performed, data may be written in or read out to and from the RAM 23, if necessary.

The data, which has been operated in the operation portion 22, and are required for the feedback APC filter processing, are fed to the VCO 7 through the contact B of a switch 10 of the data input/output portion 21. In correspondence with this input, the VCO 7 generates the reference signal of 743 kHz, which synchronizes with the color burst phase, and outputs the generated signal to the decoder 2. As mentioned above, the phase of the color burst signal is controlled by the feedback loop, which is composed of the decoder 2, color signal processing circuit 3, burst gate circuit 8, integration circuit 9, digital operation circuit 12 and VCO 7.

The control portion 24 switches to the contact on the F side, when data are output, which are operated in the operation portion 22 and are necessary for feed forward APC filter processing. As a result, the feed forward APC circuit 4 is provided with the data which are operated in the operation portion 22. In correspondence with the data supplied from the data input/output portion 21, the feed forward APC circuit 4 performs control in such a manner so as to further depress the phase difference, which has not yet been removed by the feedback loop mentioned above.

The signal of which phase has been controlled, as mentioned above, is sent to the encoder 5, and is regenerated as the chroma data of the original 3.58 MHz after the chroma data are multiplied by the reference signal of 3.58 MHz. The encoder 5 is provided with the reference signal of the frequency fsc (3.58 MHz) required for this processing. Then the chroma data are converted by the D/A converter 6, and are output as analog chroma signal.

Figure 2:
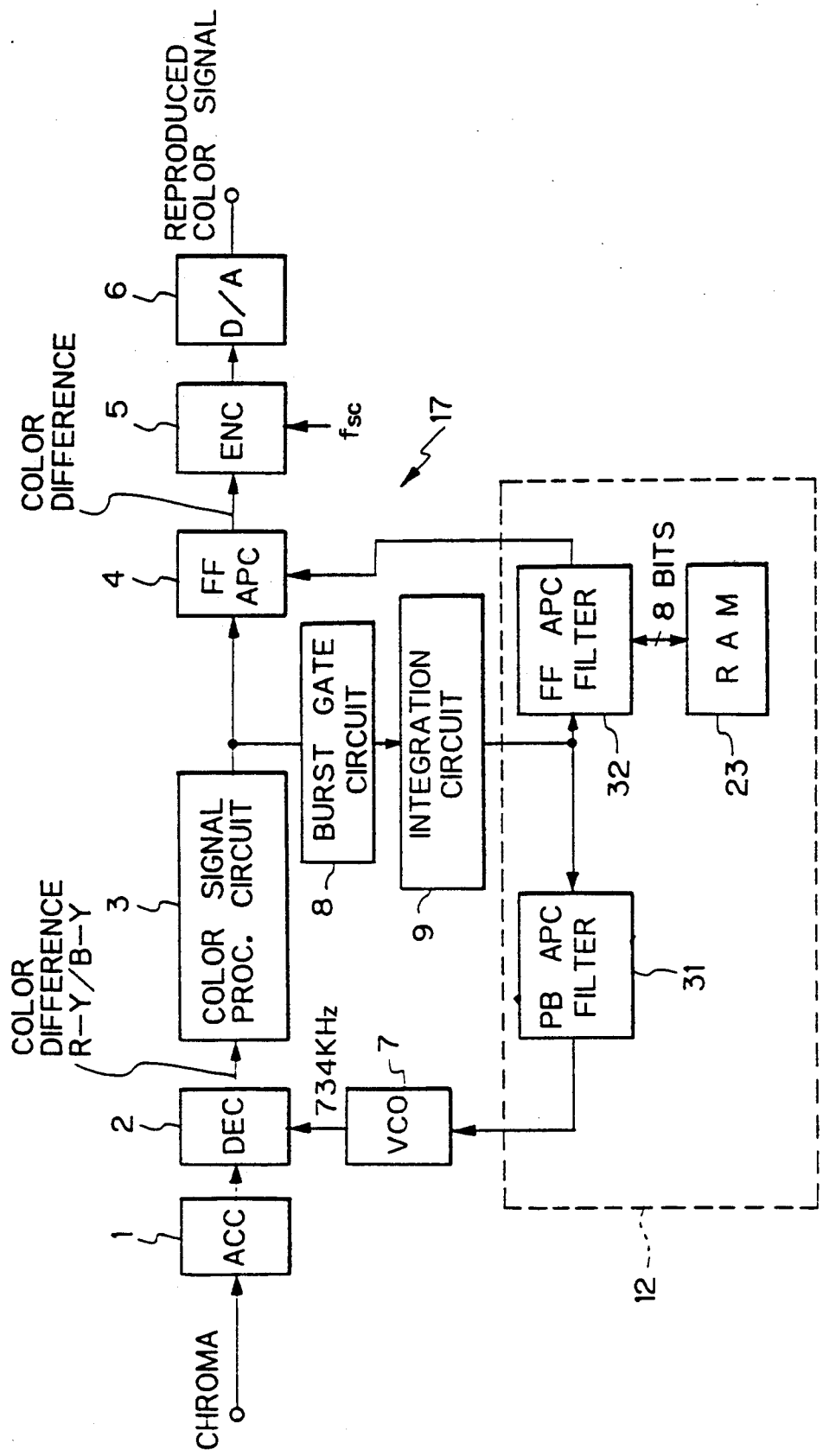
FIG. 2 is a block diagram illustrating an equivalent configuration of the embodiment in FIG. 1, in playback mode.

Accordingly, in the playback mode, the circuit in FIG. 1 is equivalent to that in FIG. 2. The operation portion 22 of the digital operation circuit 12 comprises the playback (PB) filter 31 and the feed forward (FF) APC filter 32, with which the RAM 23 is connected.

Hereunder, description will be made on the operation when an object is photographed by video camera. At this time, the control portion 24 turns a switch 11 to the contact on the C side. To the contact C, the Y, R, G and B data are supplied, which are output from the camera elements such as CCD, not shown. The data are sent from the data input/output portion 21 to the operation portion 22, and the data are stored in the RAM 23, if necessary. The operation portion 22 integrates the Y, R, G and B data individually, and stores the data in the RAM 23 as area data in correspondence with the screen split. The integrated data or histogram data are sent to the microcomputer 13. The microcomputer 13 processes the data, and generates control signals required to control the iris, focus and white balance.

Figure 3:
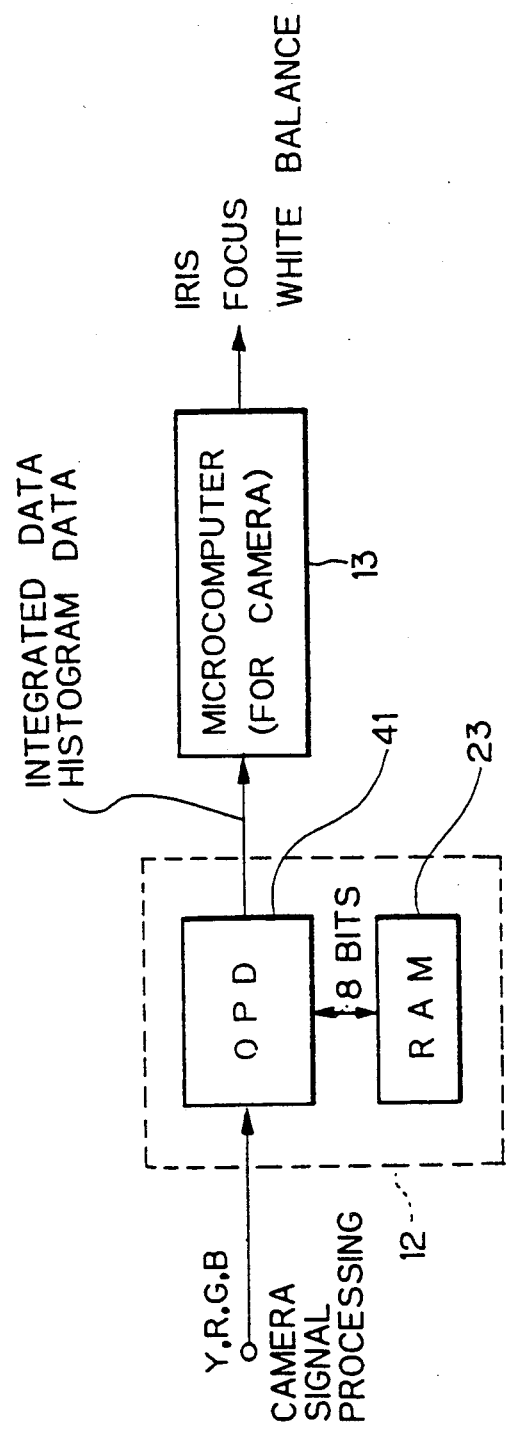
FIG. 3 is a block diagram illustrating an equivalent configuration of the embodiment in FIG. 1, in recording mode.

Therefore, in the recording mode, the circuit shown in FIG. 1 is equivalent to that shown in FIG. 3. That is, in this case, the digital operation circuit 12 is composed of an OPD (optical detector) circuit 41 and of the RAM 23. The OPD circuit 41 is a circuit composed of the operation portion 22 mentioned above.

As set forth hereinabove, the video signal processing apparatus according to this invention provides operating means which is common to the operation required for the phase controlling means and generating means, which permits reduction of the parts in number, simplification of the configuration, and cut down of the prices.

What is claimed is:

1. A video signal processing apparatus for a video camera having a video tape recording and reproducing device integrated therewith, said apparatus comprising:
   means for receiving a color signal component of an input video signal;
   phase controlling means for controlling phase of the received color signal component;
   generating means for generating a control signal for controlling at least one of iris, focus and white balance of a video signal from said video camera; and
   an operation circuit commonly used by said phase controlling means and said generating means and including input means for receiving an output signal from said phase controlling means and said video signal from said video camera, processing means for processing said output signal and said video signal received by said input means, means for supplying respective processed signals from said processing means to said phase controlling means and said generating means, and control means for controlling said input means, said processing means and said means for supplying.

2. A video signal processing apparatus according to claim 1, wherein said phase controlling means, said generating means and said operation circuit are composed of digital circuitry and wherein said operation circuit is formed on a single integrated circuit chip.

3. A video signal processing apparatus according to claim 5, wherein said phase controlling means generates a carrier signal for frequency converting said color signal component.

4. A video signal processing apparatus according to claim 1, wherein said phase controlling means includes a voltage controlled oscillator and is adapted to operate in a feed forward and a feedback manner, and wherein the processed signal obtained by processing said output signal by said processing means is supplied to said voltage controlled oscillator when said phase controlling means is operating in said feedback manner.

5. A video signal processing apparatus according to claim 1, wherein said digital video signal is obtained from a signal reproduced by said video tape recording and reproducing device.

* * * * *